United States Patent [19]

Inoue

[11] 4,367,389
[45] Jan. 4, 1983

[54] EDM SYSTEM WITH ABRASIVE FINISHER

[75] Inventor: Kiyoshi Inoue, Tokyo, Japan

[73] Assignee: Inoue-Japax Research Incorporated, Yokohama, Japan

[21] Appl. No.: 76,502

[22] Filed: Sep. 17, 1979

[30] Foreign Application Priority Data

Oct. 12, 1978 [JP] Japan ................................ 53-125451
Oct. 18, 1978 [JP] Japan ................................ 53-128847
Oct. 21, 1978 [JP] Japan ................................ 53-130195

[51] Int. Cl.³ ............................................ B23P 1/02
[52] U.S. Cl. .................................. 219/69 M; 51/5 B;
51/165 TP; 51/334; 219/69 R; 219/69 C
[58] Field of Search ............ 219/69 M, 69 W, 69 R,
219/69 C; 51/332, 334, 134.5 R, 165 TP,
165.71, 5 B, 5 C; 15/21 C; 204/129.1, 129.46

[56] References Cited
U.S. PATENT DOCUMENTS 3,650,938  3/1972  Olton et al. .................... 204/129.46
3,696,563 10/1972  Rands ................................ 51/332
3,697,403 10/1972  Colwell .......................... 204/129.46

*Primary Examiner*—C. C. Shaw
*Attorney, Agent, or Firm*—Karl F. Ross

[57] ABSTRACT

An electrical discharge machining (EDM) apparatus is rendered capable of finishing machined workpiece surfaces by mounting an abrasive tool assembly on an electrode tool head juxtaposed with the machined workpiece as it is positioned fixedly on an EDM workpiece support. The tool assembly comprises a tool, a drive motor detachably attached to the tool holder and a coupling shank, the tool having a plurality of elongate pieces fixedly mounted on the shank so as to individually project axially therefrom and extending so as to collectively form a forwardly converging body of revolution rotatable about the axis of the shank, the generatrix of the body under revolution serving as an abrading surface. The EDM servo system may be used to sweep the machined surface with the tool body.

28 Claims, 31 Drawing Figures

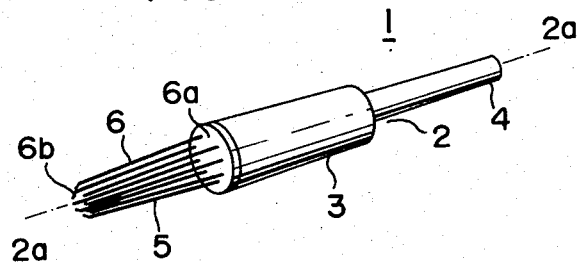
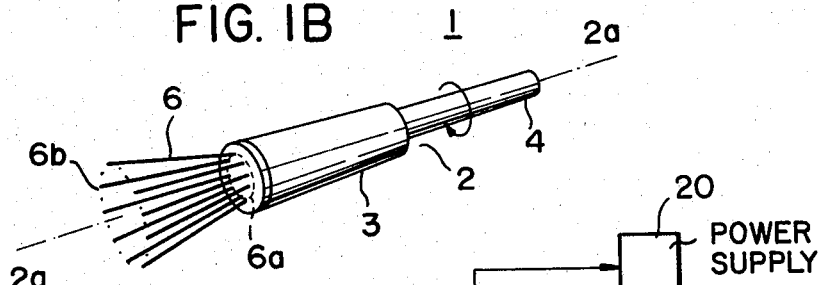
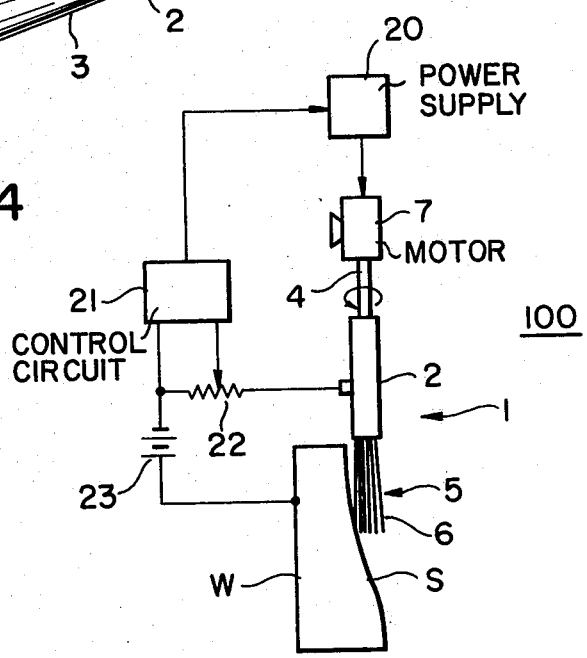

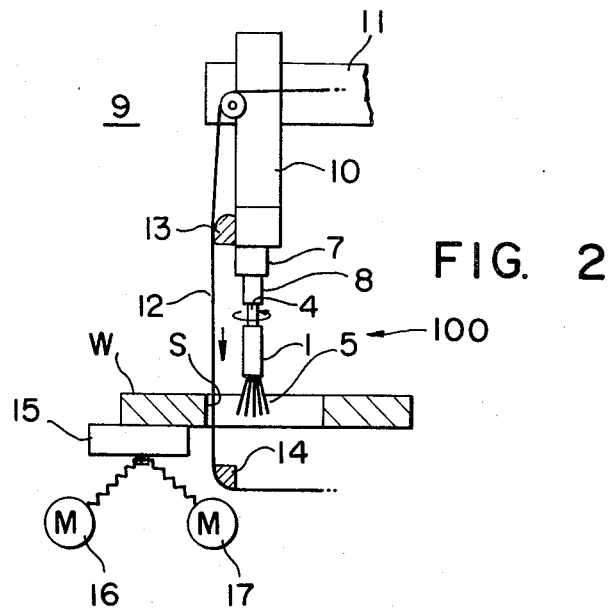
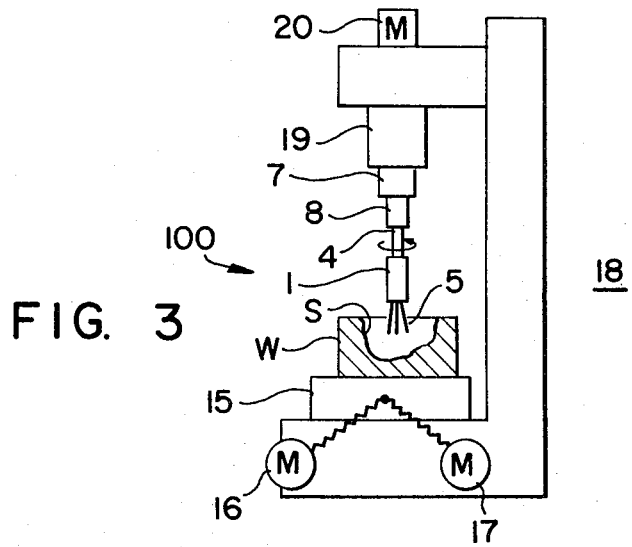

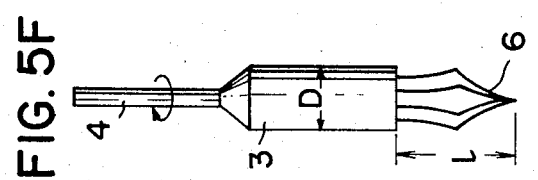
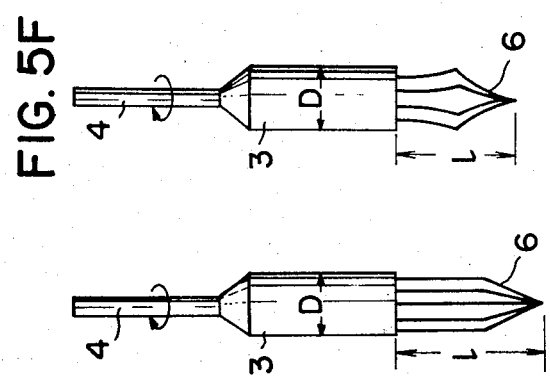
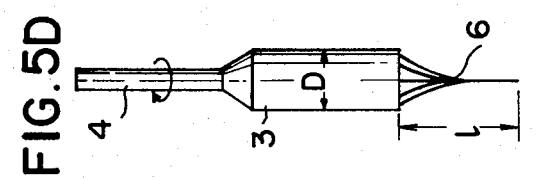
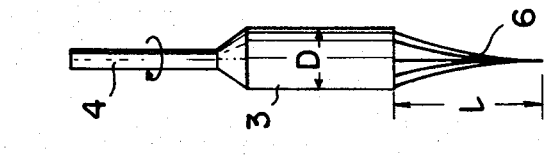
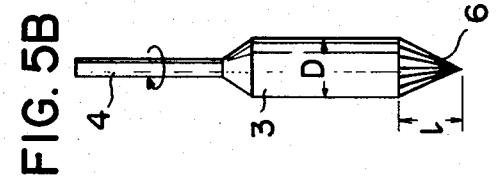
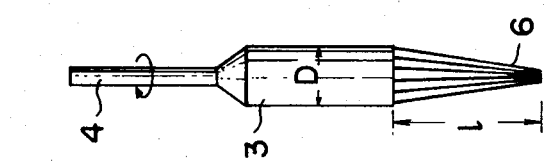

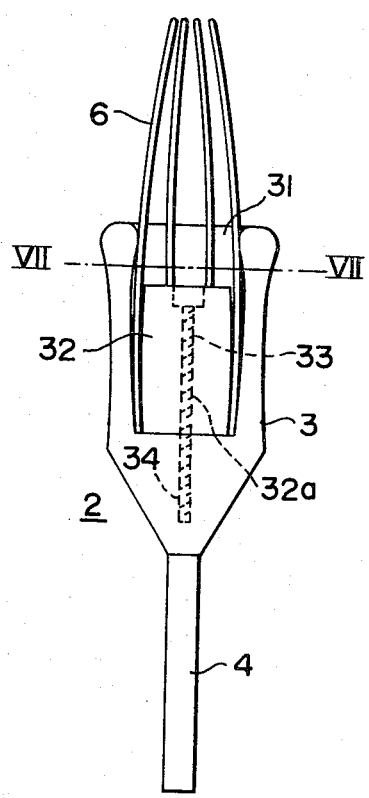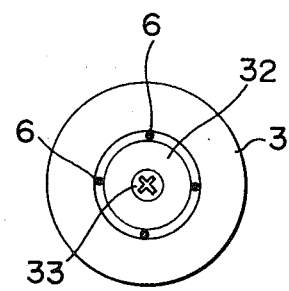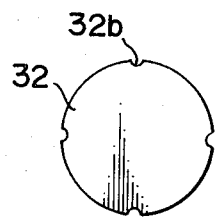

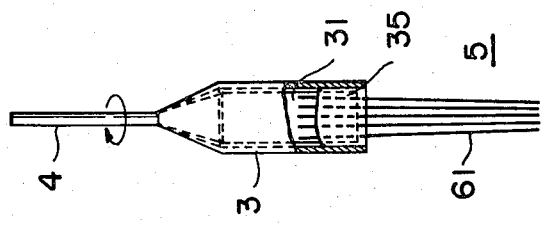
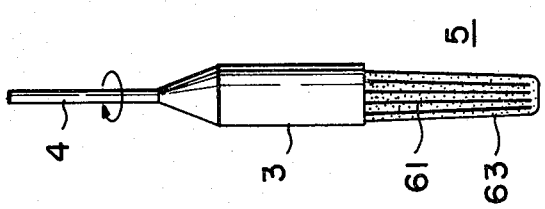
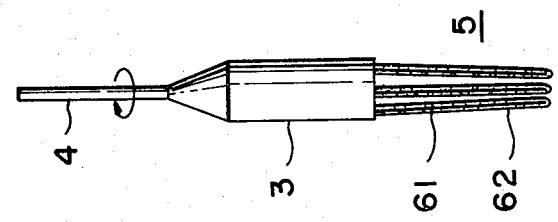

4,367,389

EDM SYSTEM WITH ABRASIVE FINISHER

FIELD OF THE INVENTION

The present invention relates to electrical discharge machines (EDM), also called electroerosion machines and, more particularly, to an electrical discharge machine having the capability of finishing electrical-discharge or electroerosively machined workpiece surfaces.

BACKGROUND OF THE INVENTION

An electrical discharge machine makes use of a power supply adapted to produce a pulsed electrical discharge repetitively across a dielectric-filled machining gap formed between a tool electrode generally in the form of a solid body (sinking-type EDM) and a wire or the like elongated continuous body (wire-cut or traveling-wire EDM) and a workpiece electrode juxtaposed therewith to impulsively remove a minute volume of material electroerosively from the workpiece while leaving a corresponding crater thereon each time the controlled electrical discharge is effected. As electroerosive material removal proceeds, an electrode-positioning or servo-feed system responds to the gap voltage or other gap variable to maintain the machining-gap size constant while a dielectric-supply unit continuously renews the machining medium which also serves as a coolant in the machining region. The operation is continued until a desired extent of machining or cutting in the workpiece is attained.

Discharge-machined or electroerosively machined surfaces are thus characterized by the peculiarity of an extremely hard "rash" formation or "satin-like" surface formation caused as a result of cumulatively overlapped discharge craters and by their extreme hardness that results from rapid heating and cooling and must generally be smoothed or finished. Furthermore, burrs may be left on the discharge-machined surfaces depending on a shape of the machining electrode used.

Heretofore, while various finishing techniques have been put into practice to finish discharge-machined or electroerosively machined surfaces, they typically require hand operation by the operator after the removal of the workpiece from the EDM unit or installation and have not been satisfactory to efficiently yield finished products which are precision-treated over the entire surfaces.

OBJECT OF THE INVENTION

It is, accordingly, an object of the present invention to provide an improved electrical discharge machine or an attachment for electrical discharge machine to enable precision-finishing of the surface of a workpiece previously shaped by the electrical discharge machine without the need for an operator's hand-finishing skill.

Another object of the invention is to provide an arrangement associated with an electrical discharge machine to enable the machine to work on a workpiece over an entire operation consistently from electrical-discharge shaping to a subsequent finishing job without resetting thereof in an operative machining position.

SUMMARY OF THE INVENTION

In accordance with the present invention there is provided an electrical discharge machine having a tool head for supporting an electrical-discharge-machining electrode and positioning it in an electrical-discharge machining relationship with a workpiece, a support for carrying the workpiece and machining-feed means for relatively displacing the tool head and the workpiece support to electroerosively machine the workpiece with the electrode, wherein the improvement which comprises an abrasive-tool assembly adapted to be detachably mounted to the tool head for finishing the workpiece surface electroerosively machined and including a rotary shank, a plurality of elongate pieces having their individual free ends and fixed at their other ends to the shank in such a manner that they individually extend axially from the shank so as to collectively form a forwardly converging body of revolution about the axis of the shank and motor means for rotating the shank to revolve the elongate pieces about the axis of the shank whereby the generatrix of the body collectively formed by the pieces under revolution undergoes an expansion toward their free ends to serve as an abrading means against the electroerosively machined workpiece surface, the abrasive-tool assembly on the tool head being displaced by the machining feed means relatively with respect to the workpiece on the workpiece support to sweep the electroerosively machined workpiece surface.

Specifically, the elongate pieces in the abrasive-tool assembly are positioned in section in a row along a circle coaxial with the rotating shank, the number of the pieces on the circle not exceeding 20. The size in diameter or width of the elongate pieces which are preferably or typically cylindrical ranges generally between 0.1 and 2 mm and preferably between 0.5 and 1 mm whereas the diameter of said circle should preferably range between 2 and 8 mm. The length l in mm of each of the elongate pieces should satisfy the relationship that $l/D$ is at least 0.5 to 1 where D is the diameter of said circle or the diameter of the head portion of said shank.

In accordance with an important feature of the present invention, the generatrices of the body of revolution collectively formed by the elongate pieces or the substantial outer lateral surfaces of the individual pieces whose one ends are held in the tool assembly by the shank are used to tangentially bear against an electroerosive machined workpiece surface to be finished. The individual elongate pieces which are so secured are resilient, stiff and yet when they are revolved with the rotation of the shank at an operating speed, are allowed to expand toward their free ends or tips so that the body generatrix which is in rest state conical or of the configuration of a forwardly convergent frustocone may become cylindrical or forwardly divergent frustconical surfaces rapidly revolving. As a result, a continuous "beating" or "slapping" effect is created by the successive high-velocity or instantaneous tangential collisions consecutively brought about between the revolving elongate surfaces and the electroerosively machined surface. With the rotation of the shank stopped, the working member resumes the original configuration of the forwardly converging body of revolution.

BRIEF DESCRIPTION OF THE DRAWING

These and other objects, features and advantages of the present invention will become more readily apparent from the following description made in conjunction with the accompanying drawing in which:

FIGS. 1A and 1B are diagrammatic perspective views of an abrasive-tool portion of the finishing-tool assembly in accordance with the present invention, the tool being shown in stationary and rotating states, respectively;

FIG. 2 is a diagrammatic view of an essential portion of a wire-cut or traveling-wire EDM machine equipped with a finishing-tool assembly in accordance with the principles of the present invention;

FIG. 3 is a diagrammatic view illustrating a sinking-type EDM machine incorporating the present invention;

FIG. 4 is a diagrammatic view illustrating an adaptive finishing operation in practicing the present invention;

FIGS. 5A–5F diagrammatically illustrate finishing tools with different forms of the working portion in elevational views;

FIG. 6 is an axial cross-sectional view diagrammatically showing an arrangement for securing the working member to a shank of the tool;

FIG. 7 is a cross-sectional view of the tool shown of FIG. 6 taken along the line VII—VII;

FIG. 8 in an end view of a core portion of the tool shown in FIGS. 6 and 7, drawn to an enlarged scale;

FIG. 9 is an elevational view partly in section of an embodiment of the finishing tool according to the invention;

FIG. 10 illustrates a modified embodiment of the finishing tool shown in FIG. 9;

FIG. 11 is an elevational view (partly broken away) of the tool similar to those shown in the previous FIGURES and illustrating a modified fixture arrangement in which the working member is secured to the tool shaft;

SPECIFIC DESCRIPTION

Figures 13A, 13B, 13C:
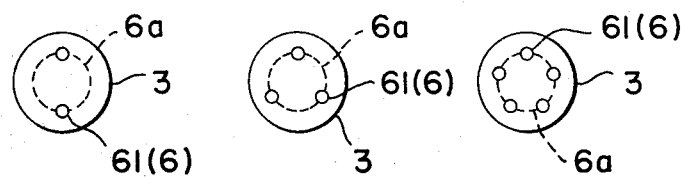
FIGS. 13A, 13B and 13C are end views of the shank portion of tools such as that shown in FIG. 12 and elsewhere to illustrate the distribution of the elongate working pieces and members.

In FIGS. 1A and 1B an abrasive tool 1 constituting the finishing-tool assembly for an electrical discharge machine of the present invention is illustrated in stationary and rotating states, respectively. The tool 1 has a shank 2 divided into a cylindrical head portion 3 and a shaft 4 coaxially secured or integral therewith and a tool working member or body 5 comprising a plurality of elongate pieces 6 fixedly mounted to the head 3, preferably detachably through an arrangement which will be described. The shaft 4 is connected to a drive shaft of an operating motor (FIGS. 2, 3 and 4) via a chuck 8 (FIGS. 2 and 3) for rotation of the tool working member 5.

The elongate pieces 6 are implanted in the cylindrical head 3 in a row along a circle shown at 6a on the end face of the head 3 so as to individually project therefrom in such a manner that they collectively form an axially converging body of rotation coaxial with the axis 2a of the shank 2 in the non-rotating or rest states.

Elongate pieces in relation to the head 3 and the imaginary circle 6a are shown to be fitted into the head 3 in varying numbers of such pieces (FIG. 13) in angularly equispaced relationship about the tool axis 2a.

Each of the elongate pieces 6 may be rod, wire or bristle composed of a substance selected from the group which consists of piano-wire steel, mild steel, hardened steel, high-speed tool steel, stainless steel, brass, tungsten carbide, titanium carbide, tantalum carbide, titanium-nickel alloy, copper-beryllium alloy, iron, nickel, aluminum, tungsten, molybdenum, copper, copper-tin alloy, boron carbide, iron-chromium alloy, plastic, graphite and glass or any stiff and resilient metal or alloy coated with a hard substance such as tungsten carbide, titanium carbide, tantalum carbide, boron carbide, silicon carbide, diamond and boron nitride (or any of the abrasive substances mentioned hereinafter) in a granular or nongranular form.

Thus a truly abrasive tool, which permits substantial amounts of material removal, can be provided with elongate pieces 6, each coated at least over part of its length with a hard substance, say diamond grits. The hard substance maybe formed directly upon the substrate surface, e.g. by hard facing or crystallographic modification (for example, the diffusion of carbon or nitrogen into the substrate) or may be applied by any method (e.g. electrode position) and bonded by any technique (including the use of bonding agents, sintering etc.).

Each elongate piece can be a sintered hard substance such as diamond or cubic boron nitride in a metal-powder matrix.

Nonmetallic elongate pieces, e.g. of plastic, glass or graphite, can have the abrasive grit imbedded therein.

The pieces 6 may each be either rounded or angular and are typically of a size in diameter between 0.1 and 2 mm and, preferably, between 0.5 and 1 mm. Such pieces may be bundled and assembled together with the head 3 so as to be arranged three to twenty in total number along the circle 6a which may then be of a diameter of 2 to 8 mm.

When the shaft 4 is rotated, the elongate pieces 6 revolve about the axis 2a. Then, as shown in FIG. 1B, the pieces 6 are forced rapidly toward their respective free ends so that their generatrices, originally defining a forwardly pointed cone or truncated cone (frustcone), forwardly expands to assume substantially a cylinder or a slight inwardly arcuate or straight cone forwardly or backwardly pointed.

In FIG. 2 there is diagrammatically shown an essential portion of a wire-cut or traveling-wire electrical discharge machine (EDM) 9 having a tool head 10. The tool head 10 suspends vertically from an upper arm 11 extending horizontally from an upright column (not shown) of the machine 9 which has also a lower arm (not shown) in a conventional manner. The upper and lower arms as well as the tool head 10 are provided in the EDM machine 9 to guide a wire or the like continuous elongate electrode 12 continuously transported between a supply reel and takeup reel (both not shown) and to position the traveling wire-electrode 12 between a pair of support members 13 and 14 in an electrical-discharge-machining relation with a workpiece W, the members 13 and 14 being carried by the tool head 10 and the lower arm, respectively. The workpiece W is mounted on a work table 15 having a usual cross-feed arrangement driven by an x-axis motor 16 and a y-axis motor 17 to displace the workpiece W in an x-y or horizontal plane relative to the wire electrode 12 traveling in a z-axis direction. The tool head 10 may adjustably be moved either manually or automatically in the vertical or z-axis direction.

In an EDM operation, a conventional EDM power supply (not shown) provided in association with the machine equipment 9 supplies a series of electrical pulses between the traveling wire 12 and the workpiece W across a machining gap while the latter is flooded with a liquid dielectric, e.g. distilled water, to electroerosively remove material from the workpiece W with the resultant succession of electrical discharges. As material removal continues, the work table 15 is displaced by the motors 16 and 17 in response to drive signals applied from a numerical controller (not shown) to displace the workpiece W along a programmed cutting path with respect to the wire electrode 12 traveling transversely thereto. Machining can be accomplished either in a straight cutting mode or in a taper cutting mode.

In accordance with the present invention the workpiece W machined by EDM is surface-finished with the machine 9 in situ by removing the wire electrode 12 and mounting an abrasive-tool assembly 100 carrying the tool 1 as basically described in connection with FIG. 1. The assembly 100 includes the electric motor 7 whose drive shaft is drivingly connected via the chuck 8 with the shaft 4 of the tool 1 to revolve the working member 5 constituted by the elongate pieces 6 about the axis 2a (FIG. 1). When the machined surface S of the workpiece W remaining on the work table 15 is contacted tangentially by the revolving pieces 6, it can be ground, lapped polished or burnished as desired. The rate of revolution is chosen from the range between 500 and 5000 rpm with a range of 500 to 2000 rpm in a relatively low load operation and a range of 5000 to 50000 rpm in a relatively high load operation and is adjusted by the setting of the motor 7. The range of high-load operation can be used with elongate tool pieces 6 shaped to be angular in section (e.g. of square form) where a substantial amount of stock is to be removed from the workpiece W with the tangential velocity of the revolving pieces 6 in the range between 1 and 15 m/sec.

In abrasive operation, the working member 5 or revolving pieces 6 may be successively brought into tangential contact with the successive machined surface S portion of the workpiece W by displacing the work table 15 in the x-y plane along the substantially same path along which it is displaced in the previous EDM operation, possibly with a slight predetermined shift therefrom. In each cycle of revolution, each piece 6 after coming out of contact with the surface S undergoes outward expansion and thereby picks up considerable kinetic energy which is released when it comes again in colliding contact with the surface S and tangentially beats or slaps the latter. This repeated "beating" or "slapping" effect produced by the revolving elongate pieces 6 is found to give rise to a markedly enhanced material removal.

By employing the basically same programmed feed as in the previous EDM operation, the contact state between the revolving pieces 6 and the workpiece W is held substantially constant to permit an increased finishing accuracy and equalized surface finish throughout the entire finishing area S.

During the finishing operation it is sometimes desirable to supply the abrading area with a machining fluid or coolant which may be the same medium as in the preceding EDM media. To facilitate abrading actions, an abrasive grit may also be suspended in the machining fluid.

In FIG. 3 there is shown a sinking-type electrical discharge machine 18 having a tool head 19 for supporting a sinking-type electrical-discharge-machining electrode (not shown) and drive means 20 for displacing the tool head 19 up and down or along the z-axis. The tool head 19 is shown carrying the finishing-tool assembly 100 which as previously described comprises the drive motor 7, the mounting chuck 8 and the tool working member 5. The latter is shown juxtaposed with a cavity S formed by an EDM operation in a workpiece W on the work table 15 which is driven by the x-axis motor 16 and the y-axis motor 17 to feed the workpiece W in the x-y plane as in the previous system. This arrangement is typically utilized in a "lateral" EDM operation in which vertical feed or sinking is followed by lateral feed.

As in the previous system, a numerical controller (not shown) may be provided to controllingly drive the motors 20, 16 and 17 in response to programmed machining command signals to displace the electrode or tool on the tool head 19 relative to the workpiece W in a predetermined three-dimensional cutting path.

In finishing operation, the motor 7 is driven to rotate the tool 1 carried in the assembly 100 on the tool head 19. As previously described the high rpm of the tool 1 causes a forwardly outer expansion of the revolving elongate pieces 6 at the working portion 5 so that they tangentially collide the discharge-machined surface S of the workpiece W with an increased sweeping velocity and kinetic energy with the resultant tangential "beating" or "slapping" effect created by the high-velocity revolving generatrix thereof to efficiently remove surface irregularities caused on the workpiece by the EDM operation. The motors 16, 17 and 20 are driven to displace the worktable 15 and the tool head 19 in the x-y plane and along the z-axis, respectively, in a programmed manner to sweep the surface S with the working member 5 of the tool 1 in a predetermined three-dimensional finishing path.

The bottom portions of the cavity in the workpiece W where the surface S' lies generally perpendicular to the axis of the tool 1 are, when brought into engagement thereby, likewise smoothly finished. Under urging pressure against the surface S, the tool member 5 or revolving pieces 6 assume at their contacting end portions slightly inward or outward radial deformation and develop there likewise the tangential "beating" or "slapping" abrasive surfaces.

In FIG. 4 there is shown a drive circuit system for adaptively operating the tool 1 in conjunction with the machine of FIGS. 2 and 3. In this system the state of abrading contact between the revolving pieces 6 and the workpiece surface S is detected for controlling the operation of the motor 7 in the tool assembly 100. Thus, a power supply 20 for driving the motor 7 is provided with a control circuit 21 whose input terminals are tied across a sensing resistor 22 connected in series with a voltage source 23 and the electrically conductive workpiece W and also via a brush with the electrically conductive shank 2 rotating at an rpm in the range already described. The relative displacement between the tool 1 and the workpiece W is performed automatically in response to a numerical controller of any known configuration to effect the relative displacement along a programmed feed path as previously indicated.

In the course of operation, change in contact pressure of the abrading tool working member 5 against the surface S will cause irregularity in abrasion which brings about irregularly finished surfaces. This change is detected in the arrangement illustrated by monitoring electrical resistance between the contacting surfaces 6 and S measured as voltage drop at the resistor 22. As the contact resistance increases with the decrease of the urging pressure, the current from the source 23 passing through the resistor 22 is reduced and the voltage drop at the latter is lowered. Conversely, the increased contact pressure causes a decreased resistance which is measured as an increased voltage drop at the resistor 22. The control circuit 21 responds to change in voltage drop in the sensing resistor 22 to control the rpm of the motor 7 by acting on the power supply 20 therefor. Increase in rpm causes an increases in the forwardly outward expansion of the revolving elongate pieces 6 which in turn results in an increased urging pressure thereby against the contacting surface S or vice versa.

In this manner, constancy in the abrading pressure between the tool working member 5 and the surface S required to obtain uniform "beating" or "slapping" effect is assured, this permitting material removal to continue with stability, with an increased finishing precision and performance for a given operation.

It should be noted that instead of its rpm, the motor 7 may alternatively have its torque controlled to maintain the contact pressure constant. In this case, upon a change in the pressure measured, the urging pressure can be increased and decreased with the increase and decrease of the torque, respectively. Likewise, the torque of the motor 7 may be measured to monitor change in the contact pressure. Still alternatively, any other pressure sensing means such as pieroelectric elements may be disposed at a suitable tool location to manifest variation in the contact pressure to control the rpm or torque of the drive motor 7 so as to hold the contact pressure constant.

While a satisfactory abrading tool operation can be performed by the abrading action of the elongate pieces 6 alone against the surface S, any one or more auxiliary measures may be taken to achieve further enhanced machining results. For example, hard abrasive grit particles may be applied on the surfaces of the individual pieces 6 or alternatively used in suspension with a machining or cooling fluid to be supplied in the region between the working member 5 and the workpiece W. The machining or cooling fluid may conveniently be a liquid dielectric or electrical-discharge-machining fluid to be continuingly used after the previous EDM operation. In addition or alternatively, an electromechanical machining current may be applied between the working member 5 and the workpiece W in the presence of an electrolyte so that material removal can be carried out by combination of electrolytic dissolution and mechanical abrading action.

EXAMPLE

A conventional practice requires 35 pieces of grindstone consisting of 80% by volume silicon carbide and the balance rubber to treat a cast body of nickel-manganese-iron alloy to modify its surface roughness from 25 $\mu$Rmax to 0.2 $\mu$Rmax, consuming approximately 3 hours. In accordance with an embodiment of the present invention a tool member with five pieces of piano wire steel of 30 mm in length and 0.8 mm in diameter implanted equispacedly along a circle of 5 mm in diameter on the end of a shank revolved at 13,000 rpm requires only 12 minutes to accomplish the identical finishing operation. Moreover, a single working member is found to be capable of yielding five similar pieces of finished product. In this case, diamond grit particles may be supplied to the region of the abrading interfaces. In a further comparison, a conventional "broom" type polisher consisting of densely packed (more than 100 strands assembled together) wires required one and a half hours to achieve a single identical operation.

In FIGS. 5A–5F there are shown various forms of tool working member 5 constituted by a plurality of elongate pieces 6 which form a more or less "pencil" or "nib" shaped forwardly converging body of revolution. Specifically, the member 5 may be of truncated conical shape (FIG. 5A), of pointed conical shape (FIG. 4B), of inwardly arcuate conical shape (FIGS. 5C and 5D), and of combined shape of a cone and cylinder (FIGS. 5E and 5F).

In these embodiments, the circle (6a in FIG. 1) from which the pieces 6 individually project is substantially in registration with the diameter of the shank head portion 3. Accordingly, the length l of the tool working member 5 may have, with respect to said diameter D, the relationship: $l/D \geq 0.5$ l.

Of various shaped members 5 illustrated, a suitable one may be selected depending on the particular configuration and size of a surface to be treated. If the latter has a recess, the pointed member has a ready access thereto. With the rotation of the shaft 4, the pieces 6 are forced to expand toward their respective free ends as mentioned previously to effectively come in bearing contact with the wall of the recess.

FIGS. 6, 7 and 8 show an arrangement whereby a plurality of elongate pieces 6 may be mounted securely upon or detachably connected to a shank 2 of the tool. Here, the head 3 of the shank 2 has a recess 31 coaxial with the shaft 4, the recess 31 being preferably tapered toward its upper end. Shown rested within the recess 31 is a plug member 32 formed centrally with an opening 32a for receiving a bolt 33 adapted to extend into the body of the head 3 coaxial therewith. The plug member 32 is shown further formed with axially extending grooves 32b (FIG. 8) equispaced on the periphery thereof corresponding in number to the pieces 6 to be mounted.

With the pieces 6 held respectively with grooves 32b of the plug member 32 against the wall of the tapered recess 31, the bolt 33 is secured to clamp the pieces 6 in place to the head 3.

FIGS. 9 and 10 show a modification of the tool working member 5 in which the plurality of elongate pieces 61 are individually (FIG. 9) or as a whole (FIG. 10) coated with a natural or synthetic resin 62, 63. So conditioned, the tool pieces 61 are rounded at their tip portions.

A support structure for the working member 5 shown in FIG. 11 makes use of a core member 35 which is slidably received in the recess 31 formed in the head portion 3 of the shank and is integral with or fixedly secured to the shaft 4. After positioning tool pieces 61 between the wall of the recess 31 and the core member 35, a bonding or soldering agent is applied to fill the spaces within the recess 31 and set to firmly unite the pieces 61, the core member 35 and the head 3 together to permit the revolution of the tool member 5 attached to the shank 5. The attachment is readily decomposed as the replacement of pieces 61 is desired.

Figure 12:
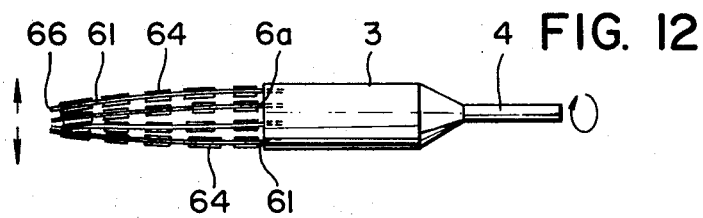
FIG. 12 is a longitudinal view of a modification of the finishing tool according to the principles of the invention.

In FIG. 12 there is shown a further modification of the abrasive finishing tool in the present invention in which each or at least in part of elongate pieces 6, e.g. a stainless-steel wire, plastic wire or glass wire, which is stiff and yet resilient, has a plurality of hard or abrasive chips 64, one spaced from the other, attached on the surface thereof, which chips are preferably composed of a ceramic. The chips 64 are also preferably elongate extending axially with the resilient supporting piece 61.

Figure 14A:
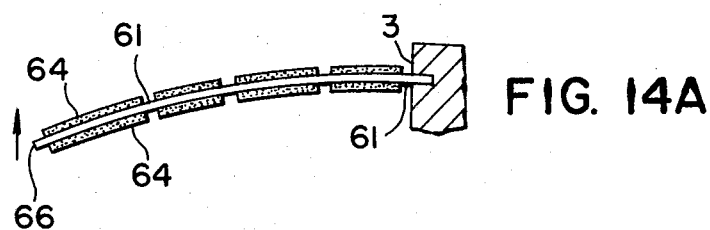
FIGS. 14A and 14B are longitudinal sections illustrating one of the elongate pieces of the tool of FIG. 12 as seen in its stationary and outwardly-spread (working) states, respectively.
Figure 14B:
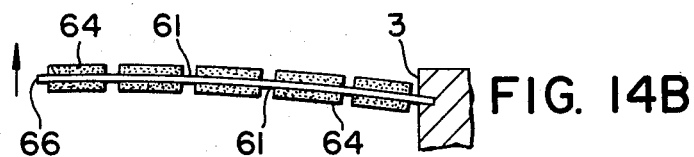

As in the embodiments which have been described previously, the piece assembly 5 has elongate pieces 61 firmly mounted equispacedly along a circle 6a to the holder 3 as shown in section in FIGS. 13A, 13B and 13C and individually slightly inclined inwardly as shown in FIG. 14A so that with the shaft 4 rotated at an operating speed of 1000 to 20,000 rpm, they resiliently expand outwardly toward the tips 66 thereof as shown in FIG. 14B so as to align substantially in parallel with the axis of the shaft 4 and holder 3.

Figure 15:
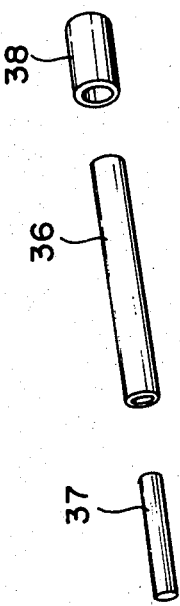
FIG. 15 illustrates a method of making a further modified finishing tool according to the invention.
Figure 16:
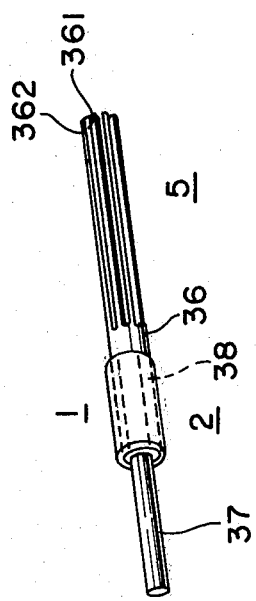
FIG. 16 is a diagrammatic perspective view of the tool made with the system of FIG. 15.

A further modified form of the abrasive finishing tool 1 as shown in FIG. 16 may be prepared simply from an elongate pipe 36, a shaft 37 and a clamping pipe 38 as shown in FIG. 15. In this case, the elongate pipe 36 is formed with a plurality of equispaced and axially extending slits 361 cut from one end thereof into a given substantial length.

As the result of such toothed formation, a plurality of annularly arranged, equispacedly and lengthwise extending elongate pieces 362 projecting uniformly in parallel with one another from the outer end portion are provided which, coupled with the end portion which forms a support member, may effectively serve as abrasive working elements as in the previous embodiments with a substantially identical function.

After formation of teeth 361, 362, the toothed portion of the pipe 36 may be mechanically deformed so as to forwardly converge and the shaft 37 is inserted into the machined pipe 36 from the unmachined end thereof into position and the clamping pipe 38 is fitted over the untoothed portion of the pipe 36 to tightly hold the same in which the shaft 37 is fixedly received as shown in FIG. 16.

Figure 17A:
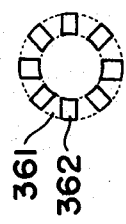
FIGS. 17A, 17B and 17C illustrate in section various configurations of the elongate pieces or members which can be used in the tool of FIG. 16.
Figure 17B:
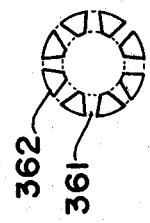
Figure 17C:
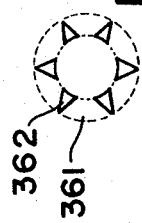

Advantageously, fixing between the shaft 37 and the pipe 36 and also between the latter and the clamping pipe 33 may be effected with the aid of an adhesive, e.g. a phenol-type or epoxy-type bonding agent or, alternatively, welding, brazing or soldering may be used. Material forming the pipe 36 may advantageously be stainless steel, mild steel, hardened steel, copper, brass or hard alloy. FIG. 17 illustrates modifications of a pipe 36 formed with slits of various shapes in cross section to provide elongate pieces of desired section (FIGS. 17A, 17B and 17C).

Figure 18A:
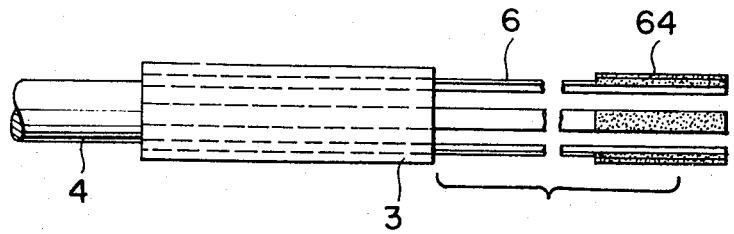
FIGS. 18A and 18B show embodiments similar to FIG. 12 but having a continuous abrasive layer extending over the tip portion of each elongate piece.
Figure 18B:
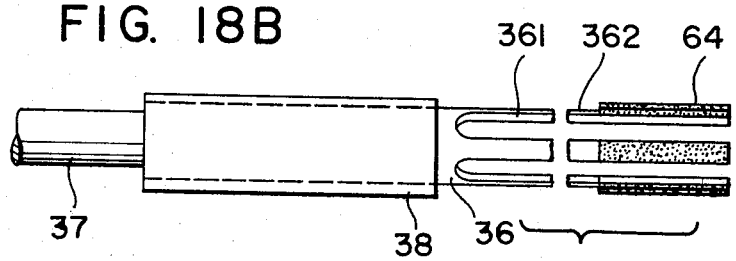

FIGS. 18A and 18B show further variations of the abrasive finishing tool wherein a thin abrasive layer 64 is applied to the tip portion of each of elongate pieces 6 originally separate and assembled together (FIG. 18A) or elongate pieces 36 provided with the toothed formation 361, 362 (FIG. 18B). The toothed formation may be provided in the manner as described. The abrasive layer may contain abrasive grits of diamond, $Al_2O_3$, BN, $Zr_2O_3$, $SiO_2$, SiC, WC, TiC, TaC etc., which may be bonded together by electrodeposition, sintering, welding or adhesive bonding.

Figure 19:
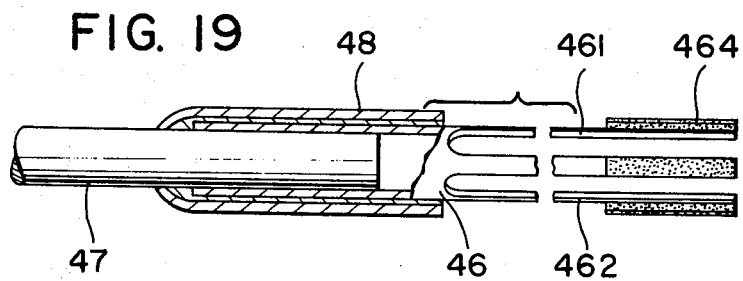
FIG. 19 illustrates a system for assembling and uniting the shaft, elongate pieces or members and the casing.

FIG. 19 shows in cross section an abrading tool assembly comprising a tubular member 46 formed with toothed elongate formations, 461, 462 at one end and having a shaft 47 received therein at the other end with each tip of elongate projections having an abrasive layer 464 of composition described. In this case, the support portion of the pipe 46 is enclosed with a tubular casing 48 with the intervening space filled with an adhesive to unite the casing 48, the pipe 46 and the shaft 47 together.

The abrasive finishing tool 1 described in the foregoing in connection with its various exemplary forms may, in accordance with the present invention, be simply mounted in an assembly 100 including a motor 7 and a coupling chuck 8 (FIGS. 2 and 3) on the tool head 10, 19 in the electrical discharge machine 9, 18 in which the electrical-discharge-machined workpiece W remains in the machining position. The EDM feed unit 16, 17, 20 may then be used in conjunction with a feed program previously used in EDM to apply a precise scanning movement of the abrasive tool member 5 relative to the machined workpiece surface S. The result is a high-precision and uniform finish over the entire machined surface region of the workpiece. Moreover, the single and common setup from the machining to finishing steps renders the entire job highly efficient and economical.

What is claimed is:

1. In an electrical discharge machine having a tool head for supporting an electrical-discharge-machining electrode and positioning it in an electrical-discharge-machining relationship with a workpiece, a support for carrying the workpiece, and machining-feed means for relatively displacing the tool head and the workpiece support to electroerosively machine the workpiece with the electrode, the improvement which comprises an abrasive-tool assembly mounted on said tool head for finishing the surface of said workpiece electroerosively machined and including a rotary shank, a plurality of elongate pieces having their individual free ends and fixed at their other ends to said shank so as to collectively form a forwardly converging body of revolution about the axis of said shank, and motor means for rotating said shank to revolve said elongate pieces about the axis of said shank whereby the generatrix of said body collectively formed by said pieces under revolution undergoes an expansion toward their free ends to serve as an abrading means in which said pieces slap against said electroerosively machined workpiece surface, said abrasive-tool assembly on said tool head being displaced by said machining feed means relatively to said workpiece on said workpiece support to sweep at least a selected portion of said electroerosively machined workpiece surface with said abrading means to abrasively finish the same.

2. The improvement defined in claim 1 wherein said elongate pieces are composed of a substance selected from the group consisting of piano wire steel, mild steel, hardened steel, high-speed tool steel, stainless steel, brass, tungsten carbide, titanium carbide, tantalum carbide, titanium-nickel alloy, copper-beryllium alloy, iron, aluminum, nickel, tungsten, molybdenum, copper, copper-tin alloy, boron carbide, iron-chromium alloy, plastic, graphite and glass.

3. The improvement defined in claim 2 wherein said elongate pieces are each of a transverse size between 0.1 and 2 mm.

4. The improvement defined in claim 3 wherein said size is between 0.5 and 1 mm.

5. The improvement defined in claim 3 wherein said elongate pieces are arranged 3 to 20 in number along a circle.

6. The improvement defined in claim 5 wherein said elongate pieces individually project by a length l in mm from said shank and are arranged along the circle of a diameter D in mm, l/D being at least 0.5 to 1.

7. The improvement defined in claim 6 wherein said diameter D is between 2 and 8 mm.

8. The improvement defined in claim 1 wherein said elongate pieces are angular in cross section.

9. The improvement defined in claim 1, further comprising means for detecting contact pressure between said elongate pieces under revolution and said electroerosively machined workpiece surface and means for controlling said motor so as to maintain said contact pressure substantially constant.

10. The improvement defined in claim 9 wherein said detecting means comprises means for sensing electrical resistance between said elongate pieces and said workpiece surface.

11. The improvement defined in claim 9 wherein said detecting means comprises means for sensing the torque of said motor.

12. The improvement defined in claim 9 wherein said controlling means is adapted to control the rate of rotation of said motor.

13. The improvement defined in claim 9 wherein said controlling means is adapted to control the torque of said motor.

14. The improvement defined in claim 1, further comprising means for detachably mounting said elongate pieces on said shank.

15. The improvement defined in claim 14 wherein said shank comprises a head portion for holding said elongate pieces therewith and a shaft portion of a reduced diameter, said head portion having a recess and a plug member adapted to be bolted to said head portion within said recess for securely holding said elongate pieces between said plug member and the wall of said recess.

16. The improvement defined in claim 1 wherein said elongate pieces are at least in part coated with a hard substance.

17. The improvement defined in claim 1 wherein said elongate pieces at least in part have a plurality of hard substance, one spaced from the other, attached on the surface thereof.

18. The improvement defined in claim 1 wherein said elongate pieces have a hard substance sintered in a metal matrix.

19. The improvement defined in claim 1 wherein said elongate pieces comprises a non-metallic body selected from the group which consists of plastic, glass and graphite and having grits of a hard substance imbedded therein.

20. The improvement defined in any one of claims 16 to 19 wherein said hard substance is selected from the group which consists of diamond, boron nitride, ceramics, solicon carbide, metal oxides and metal carbides.

21. The improvement defined in claim 1 wherein said abrading means comprises a tubular member with a plurality of axially extending slits extending from one end thereof and equispaced therearound to form said elongate pieces.

22. A method of finishing an electrical-discharge-machined workpiece surface, comprising the steps of:
 (a) electrical-discharge-machining a workpiece carried on a workpiece support with an electrical-discharge-machining electrode carried by a tool head;
 (b) forming an abrading tool with a rotary shank and a plurality of angularly spaced elongate abrasive pieces attached at one end to said shank and projecting therefrom to collectively form a forwardly converging body of revolution about the axis of said shank in a rest position;
 (c) mounting said tool on said tool head;
 (d) rotating said tool about said axis so as to spread the pieces of said body forwardly from said shank;
 (e) bringing said rotating tool in engagement with the electrical-discharge-machined surface of said workpiece on said support; and
 relatively displacing said tool head and said workpiece support to abrasively sweep said workpiece surface with the generatrices of said body serving as abrading means slapping against and finishing said surface while said tool is rotated.

23. The method defined in claim 22 wherein said tool is rotated at a speed between 500 and 50,000 rpm.

24. The method defined in claim 23 wherein said tool is rotated at a speed between 500 and 20,000 rpm.

25. The method defined in claim 23 wherein said tool is rotated at a speed between 5,000 and 50,000 rpm.

26. The method defined in claim 23 wherein said tool is rotated at a rate sufficient to sweep said abrasive pieces against said workpiece surface with a peripheral speed between 1 and 15 m/sec.

27. The method defined in claim 26 wherein said elongate pieces are angular in cross section.

28. The method defined in claim 22, further comprising the steps of:
 monitoring the force with which said body is urged against said surface; and
 controlling this force to maintain the same constant.

* * * * *